Aug. 13, 1968 DE LOSS J. TANNER 3,397,284

TELEVISION CAMERA SYNC GENERATOR WHICH DERIVES SYNC SIGNALS FROM THE HORIZONTAL AND VERTICAL SWEEP CIRCUITS

Filed May 24, 1965 2 Sheets-Sheet 1

Inventor

DeLoss J. Tanner

By

Mueller, Aichele & Rauner

Attys.

Inventor
DeLoss J. Tanner
By
Mueller, Aichele & Rauner
Attys.

United States Patent Office 3,397,284

Patented Aug. 13, 1968

3,397,284

TELEVISION CAMERA SYNC GENERATOR WHICH DERIVES SYNC SIGNALS FROM THE HORIZONTAL AND VERTICAL SWEEP CIRCUITS

De Loss J. Tanner, Bensenville, Ill., assignor to Motorola, Inc., Franklin Park, Ill., a corporation of Illinois Filed May 24, 1965, Ser. No. 457,938
7 Claims. (Cl. 178—69.5)

This invention relates to a synchronizing signal generating circuit for a television system using horizontal and vertical sweep signals in a television camera.

For a scanning the beam in a television camera tube both horizontal and vertical sweep signals are required. It is known to derive these sweep signals from a common generator. Because of the necessity for beam scanning in both the camera tube and the reproducer picture tube, and also the essential requirement that these operations must be synchronized, every horizontal sweep signal consists of a horizontal blanking pulse and a horizontal synchronizing pulse and every vertical sweep signal consists of a vertical blanking pulse and vertical synchronizing pulses. The horizontal and vertical blanking pulses derived from the common generator and shaped in a horizontal and vertical blanking generator are fed into the video circuit prior to a black level clipper circuit. This black level clipper is biased to pass video signals and to form blanking signals which are below a preset DC level and to give a flat top or uniform amplitude to the blanking signals.

The horizontal and vertical synchronizing signals may also be derived from the horizontal and vertical blanking generators and then shaped in a synchrnoizing signal generating circuit to be added to the blanking signals following the black level clipper. In order to produce a composite video signal with both blanking and synchronizing pulses, including front and back porches for the horizontal frequency components and at least a back porch for the vertical frequency components, this synchronizing signal generating circuit has usually comprised a group of expensive multivibrator circuits for forming desired pulses with predetermined width and desired delay.

It is an object of this invention to improve a synchronizing signal generating circuit nad provide a simple and inexpensive circuit.

Another object of the invention is to reduce the number of parts in a synchronizing signal generating circuit and to permit greater compactness of television cameras.

A further object of the invention is to do away with multivibrator circuits for synchronizing signal generation and to use a simple pulse processing circuit with only one active component.

In brief, the present invention may be used advantageously in any television camera system for generating synchronizing pulses using horizontal and vertical blanking components of sweep signals of a horizontal sweep generator and a vertical sweep generator respectively. The horizontal blanking signal is applied to a horizontal pulse processing circuit including a capaictor for differentiating the horizontal sweep signal and a shunt diode circuit for compressing the base of the differentiated signal, so that only a top is left forming a delayed spike with predetermined base width. The vertical blanking signal is applied to a vertical pulse processing circuit including differentiator means and clipping means for forming a spike the base of which has a predetermined width according to the desired vertical synchronizing pulses. The undesired positive-going spike at the termination of the vertical pulse is suppressed by the clipping means. The horizontal and vertical pulses thus formed are brought together at the input circuit of an amplifier. This amplifier clips off the pulses to produce flat topped synchronizing pulses, which are added to the blanking pulses following a black level clipper circuit which may be a diode biased to pass video and blanking signals below a preset DC level.

There is more than one advantageous embodiment for the vertical pulse processing circuit. One comprises a capacitor and a resistor series coupled between the vertical blanking pulse generator and the input circuit of the synchronizing pulse amplifier. The junction of the capacitor and the resistor is coupled to a shunt diode which cuts off the undesired portion of the differentiated vertical signal. Another embodiment of the vertical pulse processing circuit includes only a capacitor and a resistor series coupled between the vertical blanking pulse generator and the synchronizing pulse amplifier, the base-emitter path of which operates as a clipping circuit for the differentiated vertical signal.

Further objects, features and advantages will be apparent from a consideration of the following description taken in connection with the accompanying drawings in which.

Figure 1:
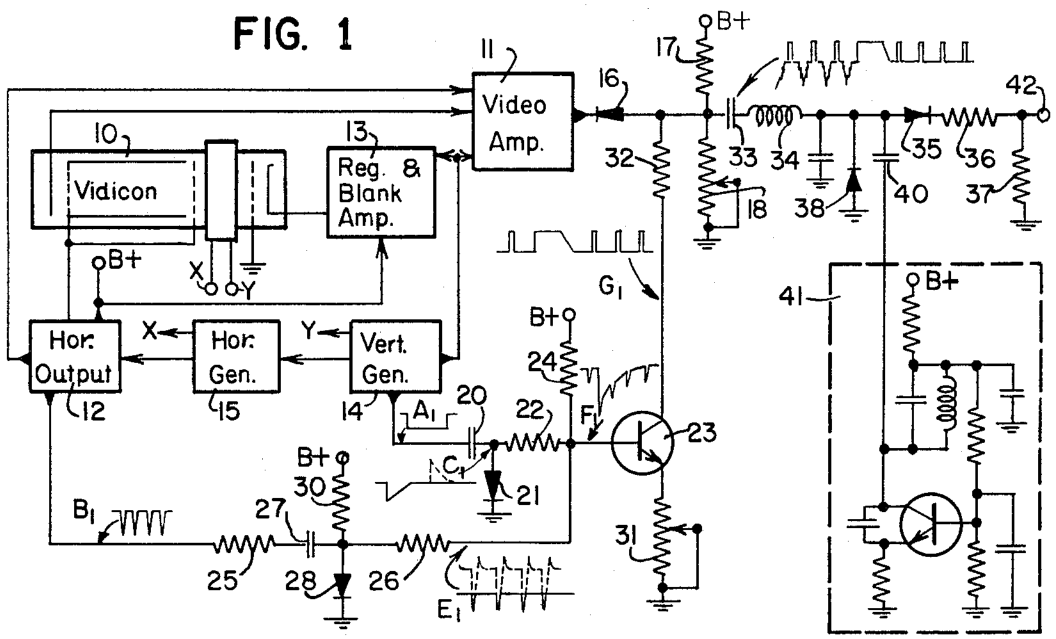
FIG. 1 illustrates a television camera system which utilizes one embodiment of a synchronizing signal generating circuit in accordance with the invention.

Referring now to the drawings, in FIG. 1 there is illustrated a television camera system incorporating the features of this invention. A vidicon 10 is coupled with its light sensitive target to a video amplifier 11, its focus and accelerating electrodes are supplied with a DC voltage derived from the horizontal sweep output and its cathode electrode is coupled to an amplifier 13 for beam current control and blanking. The vidicon control grid is grounded. The video signal obtained from the target is mixed in the video amplifier 11 with the horizontal blanking signal derived from the horizontal sweep signal output 12 and with a vertical blanking signal derived from a vertical sweep generator 14. The horizontal and vertical sweep signal is also applied to the amplifier 13 for blanking the beam current during retrace time. The horizontal sweep signal is obtained from a horizontal sweep generator 15 which is coupled to the vertical sweep generator output using it as a bias for the horizontal sweep generator. Thus, if the vertical signal fails, the horizontal signal also stops removing the vidicon supply voltage for protection of the vidicon. The output of the video amplifier 11 is applied prior to a black level clipper which is a diode 16 biased by the voltage drop at resistors 17 and 18 at the interjunction of both to pass video and blanking signals below a preset DC level. The diode 16 gives a flat top to the output blanking pulses.

Figure 3:
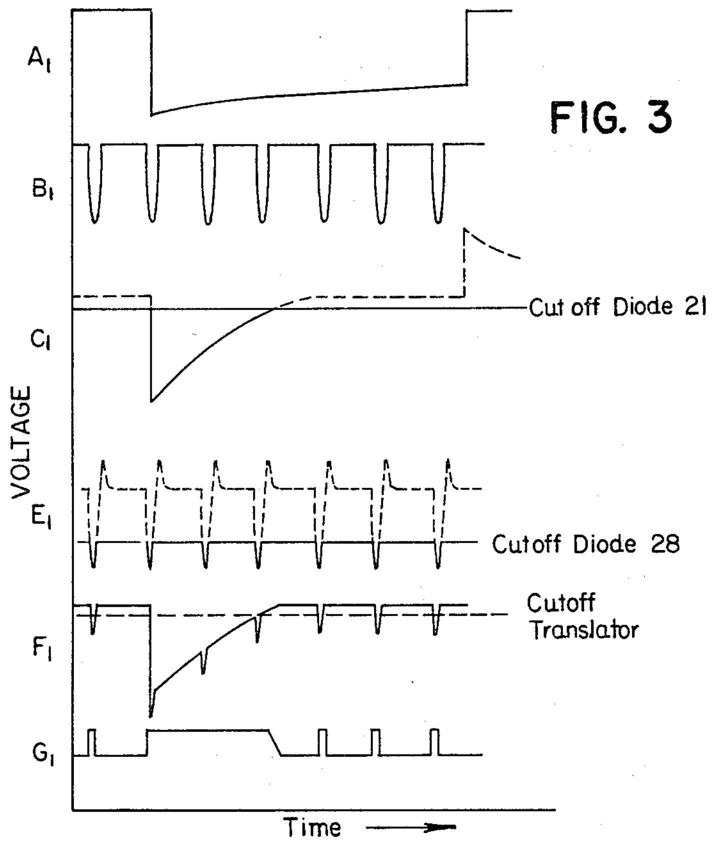
FIG. 3 shows a graph of the shape of pulses processed in a synchronizing signal generating circuit according to FIG. 1.

Referring now to FIGS. 1 and 3, the vertical synchronizing pulses are derived from the vertical sweep generator 14 the output signals $A_1$ of which are shown in larger scale in FIG. 3. These output signals are of rectangular shape with a slightly inclined top. In order to get a synchronizing pulse of predetermined base width the vertical sweep signal is differentiated by a capacitor 20 to form a spike $C_1$. The undesired positive-going spike (see dotted line) at the termination of the vertical synchronizing pulse is suppressed by the forward conduction of a shunt diode 21. A resistor 22 is connected between the junction of capacitor 20 and diode 21 and the base of an NPN transistor 23 which is biased through resistor 24 connected also to the base of the transistor.

Figure 5:
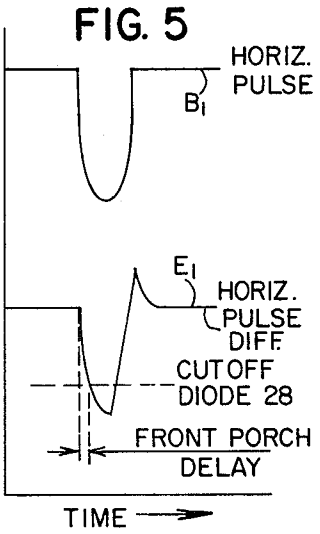
FIG. 5 illustrates in more detail the horizontal pulse of the sweep generator and its shape after differentiation.
Figure 4:
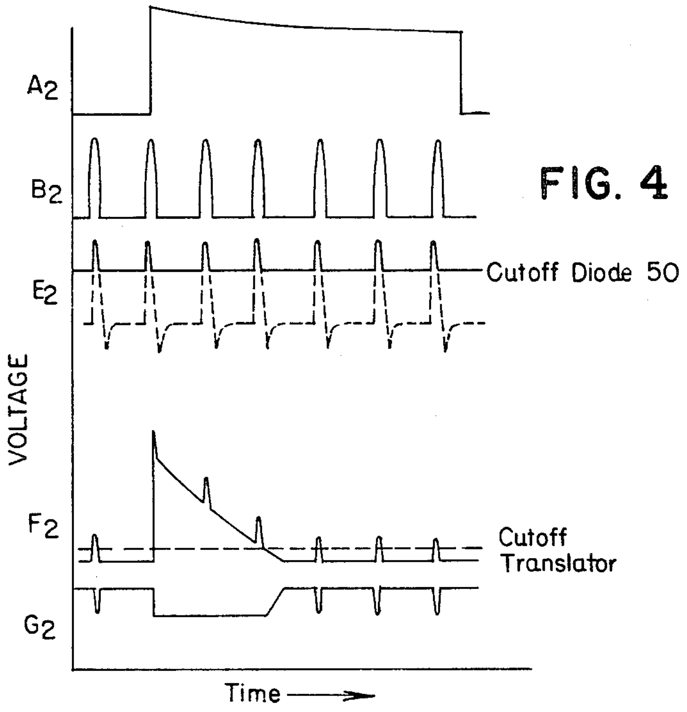
FIG. 4 shows a graph of the shape of pulses processed in a synchronizing signal generating circuit according to FIG. 2.

The horizontal synchronizing pulses are derived from the horizontal sweep signal output 12 the output signals $B_1$ are shown in larger scale in FIGS. 3 and 5. These signals are of a half cycle sine wave. This horizontal sweep signal is being shaped at the same time in a similar manner as the vertical sweep signal, however, the addition of a forward biasing resistor 30 in the shunt diode circuit and a current limiting resistor 25 in series with a differentiating capacitor 27 causes the diode 28 connected to the junction of capacitor 27 and resistor 26 to compress the base of the horizontal sweep signal more than that of the vertical pulse so that only part of the negative tip is left. The capacitor 27 is of a capacitance which only slightly differentiates the sweep signal, resulting in a pulse having the width of a normal horizontal synchronizing pulse (signals $E_1$). This delay comes about because the leading edge of the sweep signal is of a sine wave shape (shown in FIG. 5). A resistor 30 is connected with the interjunction of capacitor 27, resistor 26 and shunt diode 28, which resistor 30 fixes the level at which diode 28 becomes conductive and thereby determines the base width of the horizontal sweep signal.

The vertical and horizontal synchronizing pulse forming circuits are connected at the base of the NPN transistor 23 the emitter of which is connected with a variable emitter resistance 31 and the collector of which is series coupled through resistor 32 to the black level clipper circuit. The vertical and horizontal synchronizing signals brought together at the base are amplified, clipped off to produce a flat topped output and phase reversed for getting positive-going synchronizing pulses. The composite signals $F_1$ and the clipped synchronizing pulses $G_1$ are shown more detailed in FIG. 3. The combined vertical and horizontal synchronizing pulses are then mixed with the blanking signals and the video signal at a point in the circuit following the black level clipper diode 16 producing a composite video output signal.

This composite video output signal goes through a capacitor 33 and an inductor 34 to a modulator circuit comprising diodes 35 and 38, in a cascade voltage doubler circuit configuration, and resistors 36 and 37. The interjunction of the diodes 35 and 38 is coupled through a capacitor 40 to the output of an RF oscillator 41. The video output signal varies the conduction of the modulator diodes 35 and 38 to vary the amount of RF that gets through from the oscillator, resulting in a modulated RF output at a terminal 42.

It should be noted that the video output signal so produced has the necessary front and back porches for the horizontal synchronizing pulses to center the picture on a TV screen for the camera signal as does a regular TV station signal and has also at least a back porch for the vertical synchronizing pulses so that horizontal pulses are not lost during the entire vertical blanking interval. By this the television camera system is made equivalent to a small TV station without using expensive multivibrator circuits so that it can be hooked to the antenna terminals of any television set.

Figure 2:
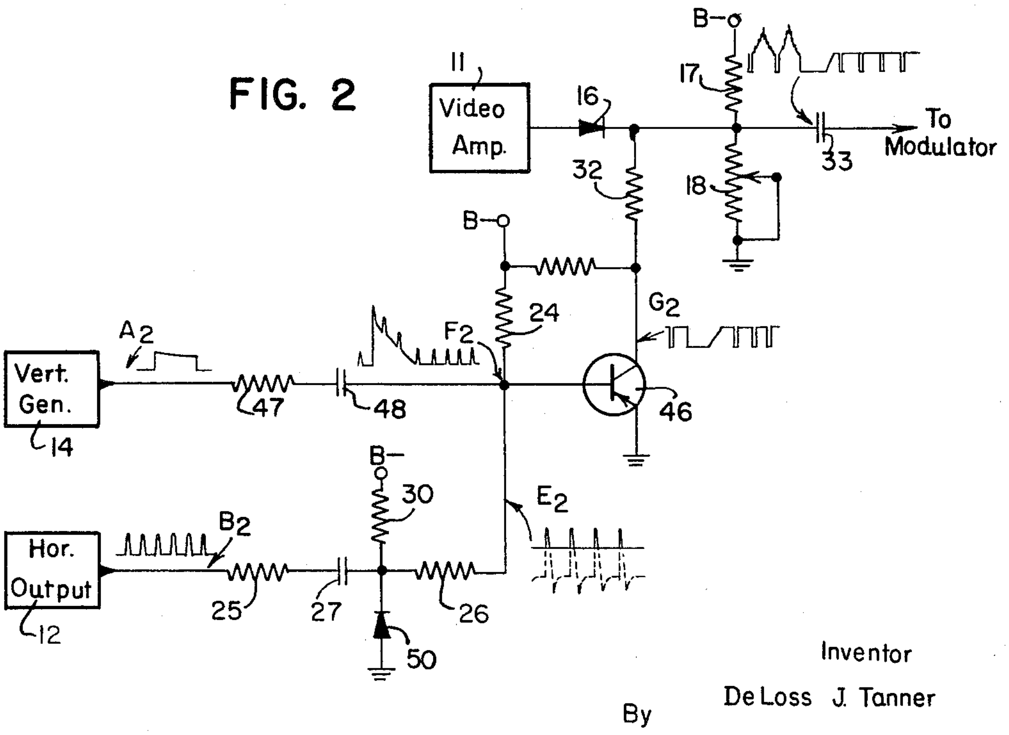
FIG. 2 illustrates another embodiment of a synchronizing signal generating circuit in accordance with the invention.

A second embodiment of a synchronizing signal generating circuit is illustrated in FIG. 2. Only shown is that part of the television camera circuit that is different from the first embodiment. The main difference is the elimination of one diode by grounding the emitter of the clipping transistor 46 and using the base to emitter junction in place of the removed diode. Doing this, the pulse forming network for the vertical sweep signal can be simplified very much. This network comprises only a resistor 47 and a differentiating capacitor 48. A special clipping diode is not necessary, because the negative-going spikes of the differentiated vertical sweep signal are suppressed by the forward conduction of the base-emitter diode of transistor 46 after it is brought together with the horizontal signal at the base of transistor 46. The only difference in the pulse forming network for the horizontal sweep signal as compared to the first embodiment is the reversal in the polarity of diode 50 because of the positive-going horizontal signals. Since the clipping transistor 46 initiates a phase reversal in the pulses and produces negative-going pulses at its collector a negative-going video signal is also required from the video amplifier 11. This is easily obtained by proper design of the video amplifier. The horizontal and vertical synchronizing pulses are mixed with blanking and video signals at a point in the circuit following the black level clipper diode 16. This composite video output is applied through capacitor 33 to the modulator circuit for producing a modulated RF output.

What has been described, therefore, is a simple and inexpensive synchronizing signal generating circuit that eliminates multivibrator circuits for generating the same and uses a simple pulse processing circuit with only one active component.

I claim:

1. A synchronizing signal generating circuit for a television system having a horizontal sweep generator, a vertical sweep generator, and a black level clipper circuit for passing blanking signals below a preset DC level and giving a flat top to the output blanking signal, said system including in combination, a pulse amplifier having input circuit means and output circuit means, said output circuit means coupled to the black level clipper circuit, a first pulse processing circuit coupled to the horizontal sweep generator, a second pulse processing circuit for forming pulse signals of predetermined width coupled to the vertical sweep generator, said first pulse processing circuit and said second pulse processing circuit coupled to said input circuit, said first pulse processing circuit including differentiator means and clipping means for forming delayed spikes with predetermined base width, said delayed spikes and said pulse signals applied to said input circuit means for composition by adding, and supplied to said pulse amplifier for producing flat topped pulses which pulses being combined with the blanking signals produce blanking pulses with synchronizing pulses at the top having a predetermined front and back porch.

2. A synchronizing signal generating circuit for a television system having a horizontal sweep generator, a vertical sweep generator, and a black level clipper circuit for passing blanking signals below a preset DC level and giving a flat top to the output blanking signal, said system including in combination, a pulse amplifier having input circuit means and output circuit means, said output circuit means coupled to the black level clipper circuit, a first pulse processing circuit for forming delayed spikes with predetermined base width coupled to the horizontal sweep generator, a second pulse processing circuit coupled to the vertical sweep generator, said second pulse processing circuit including differentiator means and clipping means for forming pulse signals of predetermined width, said first pulse processing circuit and said second pulse processing circuit coupled to said input circuit means for composition by adding, and supplied to said pulse amplifier for producing flat topped pulses which pulses being combined with the blanking signals producing blanking pulses with synchronizing pulses at the top having a predetermined front and back porch.

3. A synchronizing signal generating circuit for a television system having a horizontal sweep generator, a vertical sweep generator, and a black level clipper circuit for passing blanking signals below a preset DC level and giving a flat top to the output blanking signal, said system including in combination, a pulse amplifier having input circuit means and output circuit means, said output circuit means coupled to the black level clipper circuit, a first pulse processing circuit coupled to the horizontal sweep generator, a second pulse processing circuit coupled to the vertical sweep generator, said first pulse processing circuit and said second pulse processing circuit coupled to said input circuit, said first pulse processing circuit including first differentiator means and first clipping means for forming delayed spikes with predetermined base width, said second pulse processing circuit including second differentiator means and second clipping means for forming pulse signals of predetermined width, said delayed spikes and said pulse signals applied to said input circuit means for composition by adding, and supplied to said pulse amplifier for producing flat topped pulses which pulses being combined with the blanking signals producing blanking pulses with synchronizing pulses at the top having a predetermined front and back porch.

4. A synchronizing signal generating circuit for a television system having a horizontal sweep generator, a vertical sweep generator, and a black level clipper circuit for passing blanking signals below a preset DC level and giving a flat top to the output blanking signal, said system including in combination, a pulse amplifier having input circuit means and output circuit means, a forward biasing resistor coupled to said input circuit means, said output circuit means coupled to the black level clipper circuit, first capacitor means for differentiating the horizontal sweep generator signals and first resistor means series coupled between the horizontal sweep generator and said input circuit means, a first shunt diode circuit coupled to the junction of said first capacitor means and said first resistor means for forming delayed spikes with predetermined base width, second capacitor means for differentiating the vertical sweep generator signals and second resistor means series coupled between the vertical sweep generator and said input circuit means, a second shunt diode circuit coupled to the junction of said second capacitor means and said second resistor means for forming pulse signals of predetermined width, said delayed spikes and said pulse signals applied to said input circuit means for composition by adding and supplied to said pulse amplifier for producing flat topped pulses which pulses being combined with the blanking signals producing blanking pulses with synchronizing pulses at the top having a predetermined front and back porch.

5. A synchronizing signal generating circuit for a television system having a horizontal sweep generator, a vertical sweep generator, and a black level clipper circuit for passing blanking signals below a preset DC level and giving a flat top to the output blanking signal, said system including in combination, a NPN transistor stage having input circuit means and output circuit means, a first forward biasing resistor coupled to said input circuit means, said output circuit means coupled to the black level clipper circuit, first resistor means, first capacitor means and second resistor means, said first resistor means coupled between said first capacitor means and the horizontal sweep generator, said first capacitor means for differentiating the horizontal sweep generator signals and said second resistor means series coupled between said first capacitor means and said input circuit means, a second forward biasing resistor coupled to the junction of said first capacitor means and said second resistor means, a first shunt diode circuit coupled to the junction of said first capacitor means and said second resistor means for forming delayed spikes with predetermined base width, second capacitor means for differentiating the vertical sweep generator signals and third resistor means series coupled between the vertical sweep generator and said input circuit means, a second shunt diode circuit coupled to the junction of said second capacitor means and said third resistor means for forming pulse signals of predetermined width, said delayed spikes and said pulse signals applied to said input circuit means for composition by adding, and supplied to said NPN transistor stage for producing flat topped pulses which pulses being combined with the blanking signals producing blanking pulses with synchronizing pulses at the top having a predetermined front and back porch.

6. A synchronizing signal generating circuit for a television system having a horizontal sweep generator, a vertical sweep generator, and a black level clipper circuit for passing blanking signals below a preset DC level and giving a flat top to the output blanking signal, said system including in combination, a pulse amplifier having input circuit means and output circuit means, a forward biasing resistor coupled to said input circuit means, said output circuit means coupled to the black level clipper circuit, first capacitor means for differentiating the horizontal sweep generator signals and first resistor means series coupled between the horizontal sweep generator and said input circuit means, a shunt diode circuit coupled to the junction of said first capacitor means and said first resistor means for forming delayed spikes with predetermined base width, second capacitor means coupled between the vertical sweep generator and said input circuit means for differentiating the vertical generator signals, said pulse amplifier including a diode path for clipping said delayed spikes and said differentiated vertical generator signal composed at said input circuit means, said amplifier producing flat topped pulses which pulses being combined with the blanking signals to produce blanking pulses with synchronizing pulses at the top having a predetermined front and back porch.

7. A synchronizing signal generating circuit for a television system having a horizontal sweep generator, a vertical sweep generator, and a black level clipper circuit for passing blanking signals below a preset DC level and giving a flat top to the output blanking signal, said system including in combination, a PNP transistor stage, input circuit means comprising a base-emitter path and output circuit means, a first forward biasing resistor coupled to said input circuit means, said output circuit means coupled to the black level clipper circuit, first resistor means, first capacitor means and second resistor means, said first resistor means coupled between said first capacitor means and the horizontal sweep generator, said first capacitor means for differentiating the horizontal sweep generator signals and said second resistor means series coupled between said first capacitor means and said input circuit means, a second forward biasing resistor coupled to the junction of said first capacitor means and said second resistor means, a shunt diode circuit coupled to the junction of said first capacitor means and said second resistor means for forming delayed spikes with predetermined base width, second capacitor means coupled between the vertical sweep generator and said input circuit means for differentiating the vertical generator signal, said base-emitter path clipping said delayed spikes and said differentiated vertical generator signal composed at said input circuit means, said PNP transistor stage producing flat topped pulses which pulses being combined with the blanking signals to produce blanking pulses with synchronizing pulses at the top having a predetermined front and back porch.

References Cited

RCA, Closed Circuit Television Systems—Color and Monochrome. pp. 12–13 (1958).

ROBERT L. GRIFFIN, *Primary Examiner.*

R. L. RICHARDSON, *Assistant Examiner.*